United States Patent [19]

Nakamori

[11] 3,995,718
[45] Dec. 7, 1976

[54] SPRING DRIVE MEANS FOR TOYS

[75] Inventor: Yasuo Nakamori, Matsudo, Japan

[73] Assignee: Sanyo Onkyo Seiki Co. Ltd., Tokyo, Japan

[22] Filed: Dec. 9, 1974

[21] Appl. No.: 530,972

[30] Foreign Application Priority Data

June 6, 1974 Japan .............................. 49-65751
June 6, 1974 Japan .............................. 49-65752

[52] U.S. Cl. .............................. 185/39; 192/56 R; 46/202
[51] Int. Cl.² .............................. F03G 1/00
[58] Field of Search .............. 123/179 SE, 185 A; 189/39; 46/202, 204, 205, 206; 192/56 R; 64/28, 29

[56] References Cited
UNITED STATES PATENTS

| 2,493,232 | 1/1950 | Dodge | 64/29 |
| 2,652,045 | 9/1953 | Cole | 123/185 A |
| 2,983,121 | 5/1961 | Naas | 64/29 |
| 3,228,209 | 1/1966 | Hersey | 64/29 |
| 3,267,775 | 8/1966 | Talley | 64/29 |
| 3,283,855 | 11/1966 | Kaplan | 185/39 |

Primary Examiner—Samuel Scott
Assistant Examiner—Wesley S. Ratliff, Jr.
Attorney, Agent, or Firm—Hans Berman

[57] ABSTRACT

A spring drive means for toys comprising a spiral spring, a winding shaft for winding the spiral spring, a driven shaft, and a clutch mechanism for coupling and decoupling the winding shaft and driven shaft and including a plate spring and a gear, said plate spring and gear being provided with respective engagement sections engageable with one another by the spring force of the plate spring and detachable from one another against the spring force of the plate spring by torque applied to the two shafts.

6 Claims, 5 Drawing Figures

SPRING DRIVE MEANS FOR TOYS

This invention relates to spring drive means for toys and, more particularly, to an improved spring drive means for toys, in which a spring winding shaft for winding a spiral spring constituting the drive source for a toy can be decoupled from the driven shaft at any time so that the driven shaft may be freely stopped or reversely rotated independently of the winding shaft side.

Prior-art drive means for toys using a spiral spring as the drive source are designed such that during the spring winding operation for storing drive power in the spring a ratchet mechanism coupled to the spring winding shaft acts such that no torque is transmitted to the driven shaft side. This ratchet mechanism is uni-directional, i.e., it has the function of preventing reverse rotation, permitting the transmission of rotation only in one direction. Therefore, if the rotation of the driven shaft is suppressed, the action of the spring itself is also stopped. Also, during the transmission of the driving torque the driven shaft cannot be rotated in a direction opposite to the direction of the torque transmission. If it is intended to forcibly effect the reverse rotation, undue resistance would be given to the driving side, giving rise to damage of the driving side.

The present invention provides improvements over such prior-art spring drive means for toys. In the spring drive means for toys featured by the invention, the spring winding shaft and driven shaft are coupled and decoupled through a clutch mechanism constituted by a plate spring and a crown gear such that in the normal operation the torque of the spiral spring is transmitted from the spring winding shaft through the afore-mentioned clutch mechanism to the driven shaft. When the rotation of the driven shaft is suppressed by holding it or when the driven shaft is rotated in the reverse direction the spring winding shaft is automatically decoupled from the driven shaft so that the driving side will suffer no damage. According to the invention the driven shaft may be freely rotated in the reverse direction by hand even when the spiral spring in the spring drive means is live, i.e., it is being unwound. Thus, if an automatic music box operated by a spiral spring, for instance, is coupled to the spring drive means of a vehicle toy with a wheel axle constituted by the driven shaft, the toy may be automatically run while performing music with the restoration of the spiral spring. Also, it may be freely advanced or retreated by the manual operation, and it may be freely run even at the time of the inoperative state of the drive mechanism.

The apparatus according to the invention will become more apparent from the following description of preferred embodiments of the invention with reference to the accompanying drawings, in which.

Figure 1:
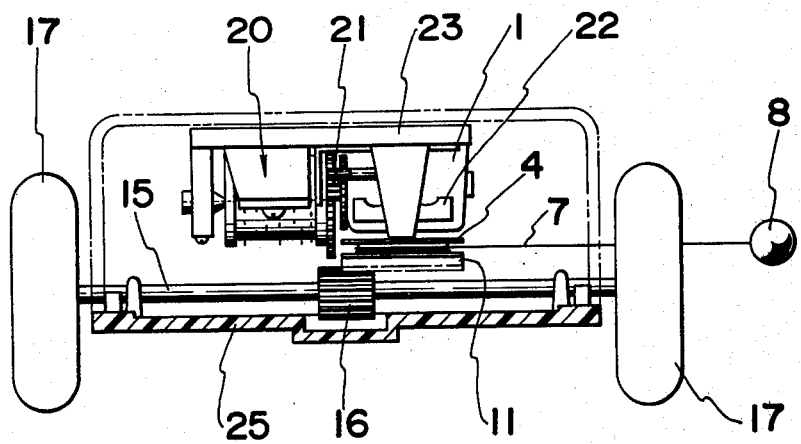
FIG. 1 is a front view, of a spring drive mechanism according to the invention mounted in a toy vehicle, with the outer cover thereof removed.
Figure 2:
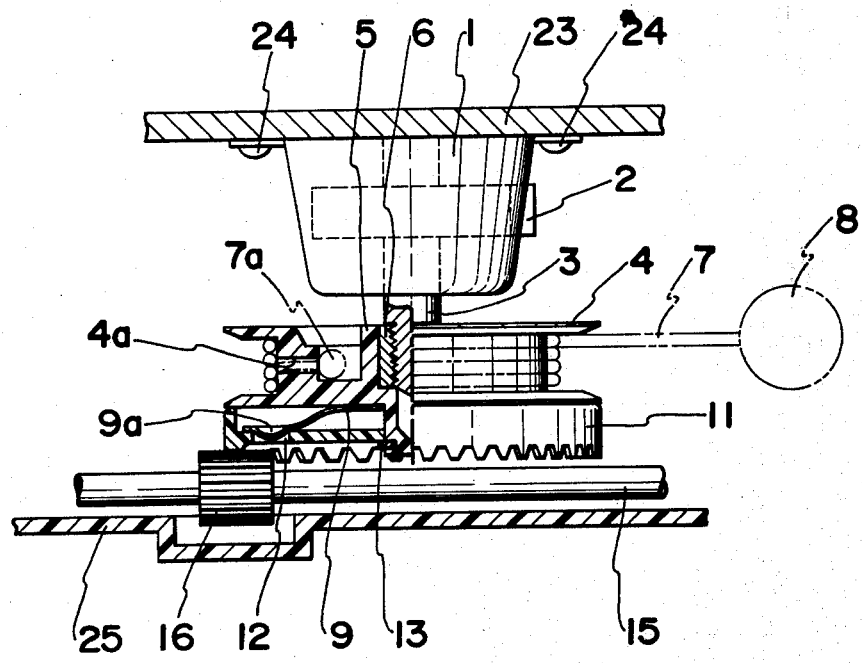
FIG. 2 is a fragmentary front view, on a larger scale of the toy of FIG. 1.
Figure 3:
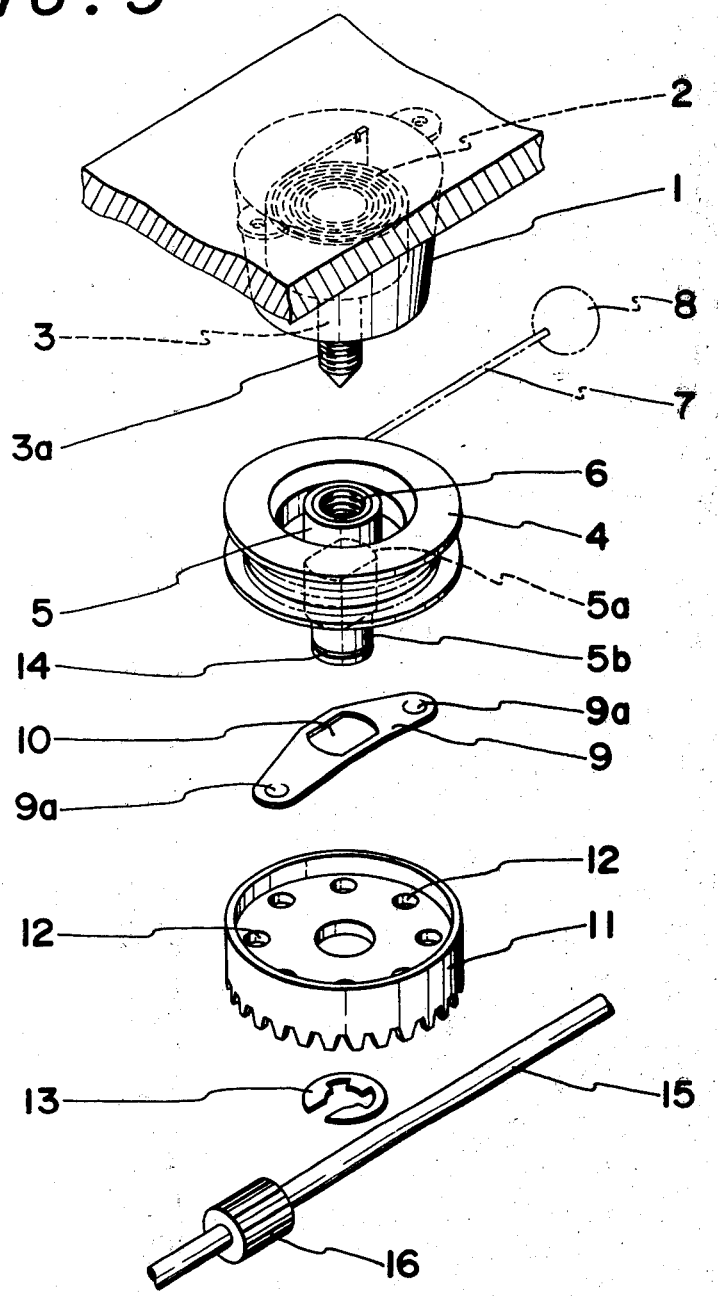
FIG. 3 is an exploded perspective view of the device of FIG. 2.

Referring now to FIGS. 1 to 3, there is shown a spring box 1 accommodating a spiral spring 2. A winding shaft 3 is rotatably mounted in the spring box 1. The spiral spring 2 has its inner end secured to the winding shaft 3 and its outer end secured to a side wall of the spring box 1. A lower portion of the shaft 3 extending downwardly from the spring box 1 is provided with a male thread 3a, on which a string take-up drum 4 is screwed. The string take-up drum 4 has an integral central tubular portion 5, the upper half of which is provided with a female thread 6, engaging the afore-said male thread 3a. A string 7 for winding the spiral spring 2 is wound on the string take-up drum 4, with its one end 7a anchored in a hole formed in the peripheral wall of the drum 4 and its other end provided with a knob 8. A plate spring 9 has a central rectangular hole 10 fitted on a rectangular intermediate part 5a of the tubular portion 5. The peripheral end portions of the spring plate 9 are axially off-set from the apertured central portion in the relaxed condition of the spring plate seen in FIG. 3. A crown gear 11 is rotatably fitted on a round lower part 5b of the tubular portion 5. The gear 11 has a disc portion formed with uniformly spaced, peripheral, round engagement holes 12. The plate spring 9 is provided at its opposite peripheral ends with substantially semi-spherical projections 9a, which are adapted to be detachably engaged in aligned holes 12 of the gear 11 by the spring force of the plate spring 9. When the projections 9a are engaged in some of the holes 12, the winding shaft 3 for winding the spring 2 is coupled to the gear 11, and this coupling is released by applying sufficient relative torque between the winding shaft 3 and clutch gear 11. The gear 11 is axially secured on the tubular portion 5 by a retainer ring 13, which is fitted in a peripheral groove 14 formed in the round part 5b. The gear 11 meshes with a gear 16 secured to a driven shaft 15 whose axis is transverse to that of the winding shaft 3.

When the string 7 is pulled, the spiral spring 2 is wound to store energy. When the string 7 is subsequently released, the winding shaft 3 is rotated by the spring 2, and the rotation of the shaft 3 is transmitted by the plate spring 9 to the gear 11 and thence to the driven shaft 15 to rotate the same. In the instant embodiment the driven shaft 15 constitutes a wheel axle in the toy vehicle shown in FIG. 1, and carries wheels 17.

If a frictional resistance is produced between plate spring 9 and gear 11 while the spiral spring 2 is being wound, for instance when the wheels 17 are braked or forcibly rotated in the reverse direction against the torque provided from the winding shaft 3, the plate spring 9 is automatically decoupled from the gear 11 against its spring force and slips on the disc of the gear 11. In this state, the spiral spring 2 can be wound while the rotation of the shaft 3 is not obstructed. It will be appreciated that in the case of the illustrated toy vehicle the forward or backward movement of the toy may thus be brought about without utilizing the spring force but by manual operation. If this spring drive means is assembled with an automatic music box, as generally indicated at 20 in FIG. 1, the music box may be operated simultaneously with the rotation of the drive shaft 15 and the wheels 17. The music box 20, however, will continue to be operated even if the rotation of the wheels 17 is stopped. A reduction gear transmission 21 connects the automatic music box 20, as a load to the shaft 3 and to a speed governor 22. The automatic music box 20 and the spring box 1 are mounted by bolts 24 on a base 23 and a chassis 25 so that the fixedly connected box 1, base 23, and chassis 25 jointly constitute the support structure of the toy.

Figure 4:
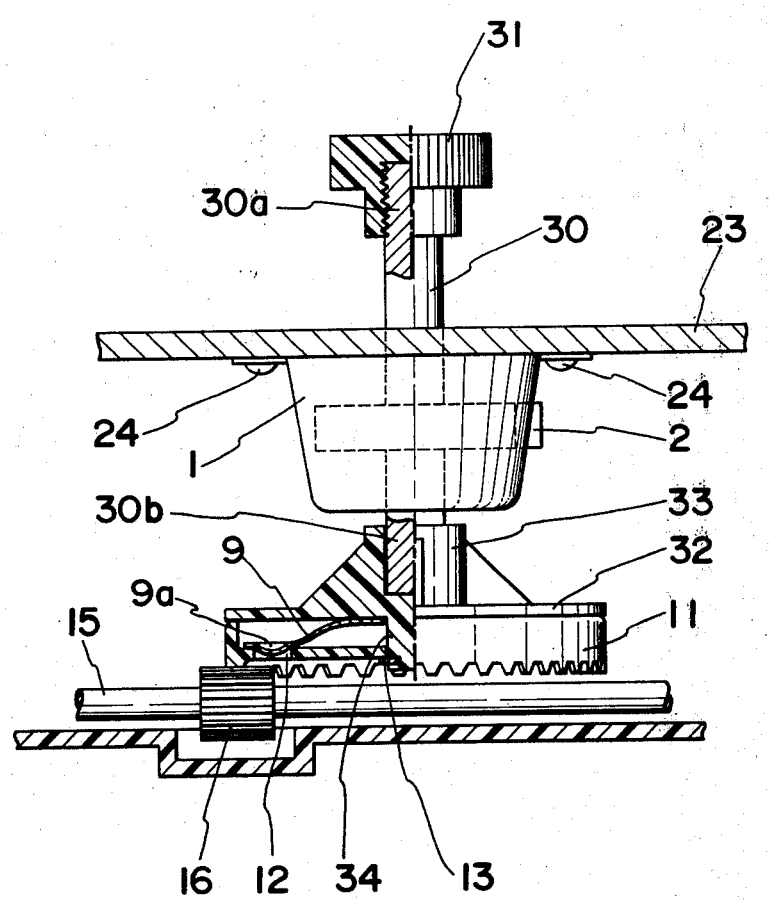
FIG. 4 shows another embodiment of the invention; in the manner of FIG. 2.
Figure 5:
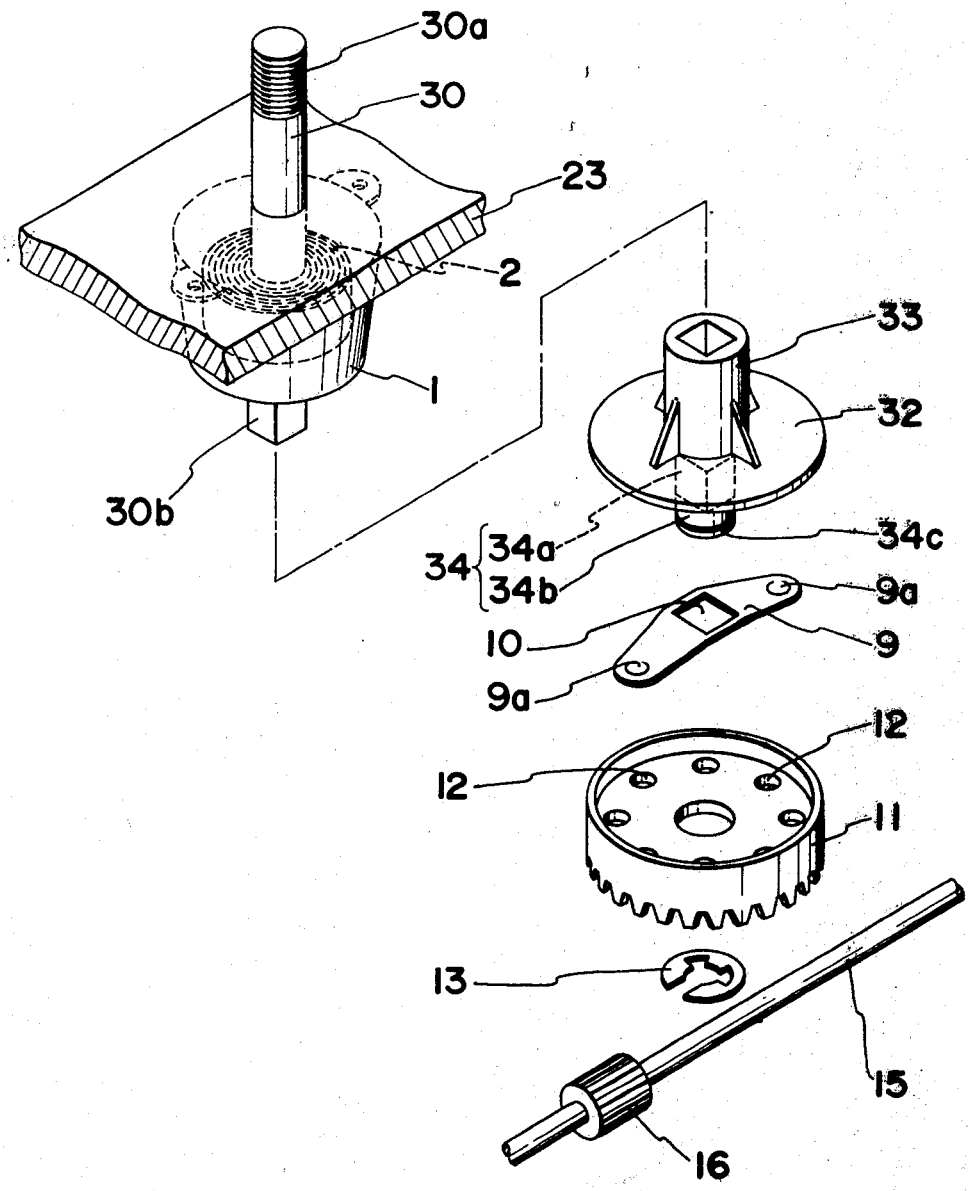
FIG. 5 is an exploded perspective view of elements of the device of FIG. 4.

FIGS. 4 and 5 show another embodiment of the invention. In FIGS. 4 and 5, like parts as in FIGS. 1 to 3 are designated by like reference characters.

A winding shaft 30 vertically passes through spring box 1 accommodating spiral spring 2 and is rotatably mounted in the spring box 2. The spring box 1 is secured by bolts 24 to base 23. An upper end portion of the winding shaft 30 is provided with a male thread 30a, on which a knob 31 is screwed, so that the spiral spring 2 may be wound by manually turning the knob 31. The lower end of the winding shaft 30 extending from the spring box 1 includes a rectangular portion 30b, on which is snugly fitted a boss 33 integral with and extending upward from the center of a spring backing member 32. The backing member 32 also has an integral lower shaft portion 34 extending downward from its center. The lower shaft portion 34 consists of a rectangular upper part 34a and a round lower part 34b. Plate spring 9 rotates with the winding shaft 30 because its rectangular hole 10 is fitted on the rectangular part 34a of the lower shaft portion 34. Fitted rotatably on the round part 34b of the lower shaft portion 34 is crown gear 11. The gear 11 is retained in its axial position on the round portion 34b by retainer ring 13 engaging a peripheral groove 34c in the round part 34b. The plate spring 9 is provided at its opposite ends with substantially hemispherical cam portions 9a, while the gear has a radial disc portion formed with uniformly spaced round engagement holes 12. The cam portions 9a and engagement holes 12 constitute the automatic clutch mechanism normally engaged under the spring force of the plate spring 9, when axially aligned, whereby the winding shaft 30 is coupled to the gear 11, and this coupling is released upon application of relative torque to the winding shaft 30 and gear 11 sufficient to overcome the spring force of the plate spring 9. The gear 11 is coupled to gear 16 of drive shaft 15.

I claim:
1. A spring drive arrangement for a toy comprising:
 a. a support;
 b. a winding shaft having a first axis and mounted on said support for rotation about said axis;
 c. a spiral spring having respective ends secured to said shaft and to said support;
 d. winding means for turning said shaft and for thereby storing energy in said spring, said spring when wound tending to turn said shaft;
 e. a driven shaft mounted on said support for rotation about a second axis transverse to said first axis and carrying a gear wheel; and
 f. clutch means for releasably connecting said shafts and for thereby transmitting torque from said spring to said driven shaft, said clutch means including:
  1. a plate spring member and a crown gear member mounted for rotation about said first axis and having each a central portion adjacent said first axis and a peripheral portion spaced from said first axis,
  2. said plate spring member being connected to said winding shaft for simultaneous rotation with the connected shaft,
  3. said crown gear member meshingly engaging said gear wheel,
  4. cooperating engagement means on said peripheral portions of said members and axially alignable by relative rotation of said members, the resilient force of said plate spring member biasing the aligned engagement means into torque transmitting engagement, said engagement means responding to torque applied to said members sufficient to overcome said resilient force by being disengaged, and
  5. retainer means for axially securing said central portions relative to each other.

2. An arrangement as set forth in claim 1, wherein one of said engagement means includes cam means for axially displacing said peripheral portion of said plate spring member in response to said applied torque.

3. An arrangement as set forth in claim 1, wherein one of said members carries a projection of arcuate cross section, and the other member is formed with a recess dimensioned for receiving said projection, said projection and said recess constituting said cooperating engagement means.

4. An arrangement as set forth in claim 3, wherein said one member is said plate spring member, said peripheral portion of said plate spring member being axially offset from said central portion in the relaxed condition of the plate spring member.

5. An arrangement as set forth in claim 4, further comprising two wheels mounted on said driven shaft in axially spaced relationship.

6. An arrangement as set forth in claim 5, further comprising a load, and transmission means operatively interposed between said winding shaft and said load for driving said load when said shafts are released by said clutch means.

* * * * *